(12) United States Patent
McCormick, Jr. et al.

(10) Patent No.: US 7,747,844 B2
(45) Date of Patent: Jun. 29, 2010

(54) ACQUIRING INSTRUCTION ADDRESSES ASSOCIATED WITH PERFORMANCE MONITORING EVENTS

(75) Inventors: James E. McCormick, Jr., Fort Collins, CO (US); James R. Callister, Windsor, CO (US); Susith R. Fernando, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1488 days.

(21) Appl. No.: 11/095,072

(22) Filed: Mar. 31, 2005

(65) Prior Publication Data

US 2006/0224873 A1    Oct. 5, 2006

(51) Int. Cl.
    *G06F 9/30*    (2006.01)
(52) U.S. Cl. ........................ 712/227; 712/244
(58) Field of Classification Search ................ 712/227, 712/244
    See application file for complete search history.

(56) References Cited

U.S. PATENT DOCUMENTS

| 5,450,555 | A  | * | 9/1995  | Brown et al. ................ 712/228 |
| 5,751,945 | A  | * | 5/1998  | Levine et al. ................ 714/47 |
| 6,353,805 | B1 |   | 3/2002  | Zahir et al. |
| 6,415,378 | B1 | * | 7/2002  | Davidson et al. ............ 712/207 |
| 6,609,247 | B1 |   | 8/2003  | Dua et al. |
| 7,181,599 | B2 | * | 2/2007  | DeWitt et al. ............... 712/227 |
| 7,328,331 | B2 | * | 2/2008  | Del Vigna et al. ........... 712/225 |
| 7,487,502 | B2 | * | 2/2009  | Wang et al. ................ 718/102 |
| 2003/0004974 | A1 |   | 1/2003  | Wang et al. |
| 2003/0188139 | A1 |   | 10/2003 | Chrysos et al. |
| 2004/0049658 | A1 |   | 3/2004  | Kabasawa et al. |
| 2004/0068643 | A1 |   | 4/2004  | Dowling |
| 2004/0073906 | A1 |   | 4/2004  | Chamdani et al. |
| 2004/0163083 | A1 | * | 8/2004  | Wang et al. ................ 718/102 |
| 2005/0149697 | A1 | * | 7/2005  | Enright et al. .............. 712/214 |
| 2005/0154805 | A1 | * | 7/2005  | Steely et al. ................ 710/52 |
| 2005/0166039 | A1 | * | 7/2005  | Wang et al. ................ 712/227 |
| 2006/0168434 | A1 | * | 7/2006  | Del Vigna et al. ........... 712/244 |

OTHER PUBLICATIONS

European Search Report for Application No. GB0606128.7 mailed on Jun. 1, 2006.
Vaswani et al., A Programmable Hardware Path Profiler, Proceedings of the Intl. Symposium on Code Generation and Optimization (CGO'05) Dept. of Computer Science and Automation Indian Institute of Science, Bangalore.

* cited by examiner

*Primary Examiner*—Aimee J Li

(57) ABSTRACT

Systems, methodologies, media, and other embodiments associated with acquiring instruction addresses associated with performance monitoring events are described. One exemplary system embodiment includes logic for recording instruction and state data associated with events countable by performance monitoring logic associated with a pipelined processor. The exemplary system embodiment may also include logic for traversing the instruction and state data on a cycle count basis. The exemplary system may also include logic for traversing the instruction and state data on a retirement count basis.

30 Claims, 9 Drawing Sheets

ACQUIRING INSTRUCTION ADDRESSES ASSOCIATED WITH PERFORMANCE MONITORING EVENTS

BACKGROUND

Processors (e.g., microprocessors in computers) may include performance monitoring components (e.g., hardware, firmware, software) that are configurable to detect and count occurrences of various events. For example, performance monitoring components may count occurrences of instruction cache misses, data cache misses, events associated with instruction dependencies, events associated with resource conflicts, and so on. Upon detecting and counting an event, the performance monitoring components may capture and record information related to the event. For example, information like the address of an instruction retiring at the time the counted event occurred may be acquired and written to a data store. This information may facilitate understanding why and/or how a processor is performing in a certain manner.

Processors may have a pipelined architecture. For example, early processors may have had a two stage pipeline where the next instruction to be executed was fetched while the current instruction to execute was executed. Thus, an event to be counted may have been associated with either the fetching of an instruction or execution of an instruction. Later processors may have had pipelines with more stages (e.g., fetch, decode, execute, retire). Events to be counted may have occurred as a result of an instruction located at various stages in the pipeline. For example, an instruction retiring may have been an event to be counted. When counted, an instruction pointer and other information associated with the retiring instruction may have been saved.

Processors may also have a parallel architecture. For example, a processor may have two or more pipelines through which sets of instructions may progress. Thus, events to be counted may have occurred as a result of an instruction being processed in various pipelines. Pipelined architectures and/or parallel architectures may interact with multiple execution units. For example, a processor may have two integer processing units and two floating point processing units. Thus, various instructions at various stages of various pipelines may be dispatched to various execution units. Clearly this impacts the efficacy and complexity of performance monitoring systems and methods. Thus, while some useful information could conventionally be acquired from performance monitoring logic by capturing information associated with retiring instructions, other information may have been ignored or considered unobtainable due to complexities associated with multiple pipeline stages, parallel architectures, multiple execution units, and so on.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
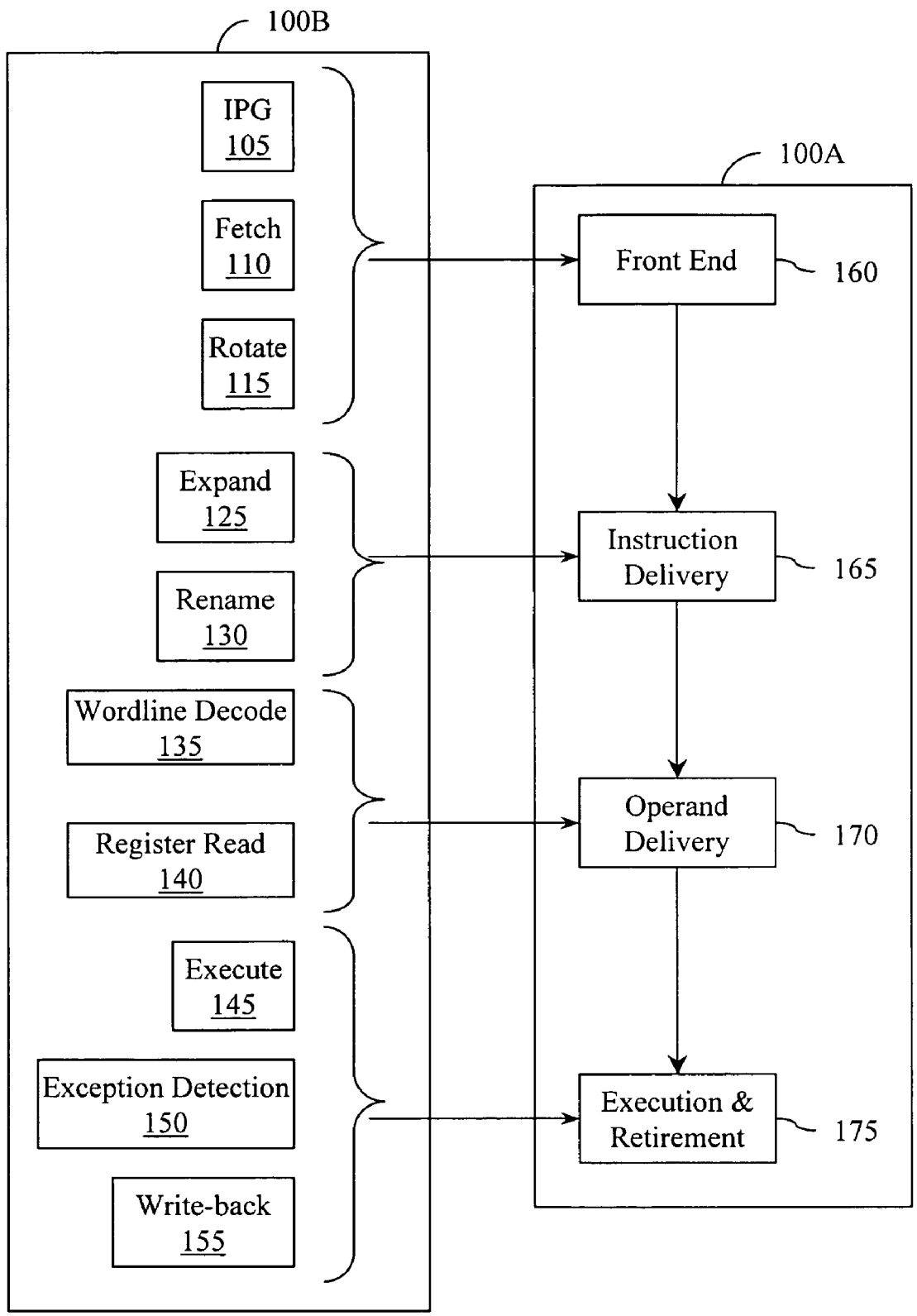
FIG. 1 illustrates two views of an example execution pipeline for a microprocessor.

Example systems and methods described herein may facilitate acquiring (e.g., capturing and locating) the address of an instruction associated with an event counted by performance monitoring logic in a microprocessor. When an event is counted, information like the address of an instruction associated with (e.g., causing) the event may be captured and stored in hardware. By way of illustration, a captured instruction address may be associated with an event like an instruction cache miss, a data cache miss, a stall caused by a data cache miss, a structural hazard, a data dependency hazard, a control hazard, and the like. By way of further illustration, if an instruction references data that is not located in an on-chip data cache, then the processor may have to go to memory to acquire the data. Going to memory may consume a relatively long period of time and thus may be an event the performance monitoring logic is configured to count. Therefore, the address of the instruction and other related state information may be stored by the performance monitoring logic in the performance monitoring logic and/or other hardware. While recording the information is itself valuable, selectively navigating through the information using different navigation techniques (e.g., cycle based, retirement based) facilitates acquiring data like the address of an instruction executing at an identified pipeline stage when a counted event occurred.

Conventional performance monitoring logic in a processor may have included hardware that is configured to match specified patterns of instruction opcode, address, cache hit/miss status, branch mispredictions, and so on. The matched signals may have been combined, for example, using an on-chip state machine to detect specific sequences of events. Additionally, the state machine may have caused an event counter(s) to increment. The event counter(s) may have been configured to increment based on control signals that indicate what a processor was doing at a given time. This conventional logic may be augmented with additional logic to facilitate acquiring different information and/or processing it in different manners.

Microprocessors may employ one or more pipelines that allow multiple instructions to execute substantially concurrently. With pipelines, processor instruction execution may be broken down into a sequence of sub-instruction phases known as pipeline stages or pipestages. The pipestages may be buffered so that in an N-stage pipeline, N stages from N instructions may execute substantially concurrently. Multi-issue processors may fetch multiple instructions per clock cycle and dispatch multiple instructions to multiple pipelines per clock cycle. Thus, in one example, countable events may be associated with instructions being executed at different stages in different pipelines. Conventional performance monitoring logics may only have acquired and/or made available information associated with an instruction retiring from a pipeline. Thus, information concerning an instruction executing at an earlier stage in a pipeline may not have been collected. Even if such data was collected, it may have been difficult, if possible at all, to navigate to such data. It may be difficult, if possible at all, to collect a larger piece of data like the instruction address associated with a variety of events for at least two reasons. First, the signal that indicates that the event occurred may not be co-located with the larger piece of data (e.g., instruction address). Therefore, logic and time may be required to associate the signal with the proper larger piece of data. Second, the larger piece of data may need to be conveyed to a storage area in, for example, the performance monitoring unit. For a large piece of data (e.g., 60 bits), it is not feasible to provide interconnecting wires and intermediate storage devices from every possible event to an associated location in the performance monitoring unit storage device.

Pipeline performance may be limited by conditions known as "hazards" that may occur during program execution. Hazards may include structural hazards, data dependency hazards, control hazards, and so on. The occurrence of a hazard may lead to a pipeline stall, where the pipeline may not be able to accept new instructions during the pendency of the hazard. Hazards may be caused by instructions executing at different pipeline stages. A structural hazard stall may occur, for example, if multiple instructions contend for limited hardware resources. A data dependency hazard stall may occur, for example, if instructions read and/or write from the same data location in a manner that may produce a race condition. A control hazard stall may occur, for example, when a branch, interrupt, exception, or the like, modifies program control flow. Understanding how and why such hazard stalls occur facilitates improving processor performance. Thus, performance monitoring logic may be configured to count events that lead to such stalls. Additionally, and/or alternatively, performance monitoring logic may be configured to count other events of interest like data and/or instruction cache misses. Example systems and methods described herein may facilitate capturing and navigating to data like instruction addresses and data addresses associated with event causing instructions regardless of the pipestage at which the instruction was executing.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software stored in a computer-readable storage medium, a combination thereof, or software in execution by a processor. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11, IEEE 802.15), an Ethernet system (e.g., IEEE 802.3), a token ring system (e.g., IEEE 802.5), a local area network (LAN), a wide area network (WAN), a point-to-point system, a circuit switching system, a packet switching system, combinations thereof, and so on.

"Computer-readable medium", as used herein, refers to a storage medium that, stores instructions and/or data. A computer-readable medium may take forms, including, but not limited to, non-volatile media, and volatile media. Non-volatile media may include, for example, optical or magnetic disks, and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic media, a CD-ROM, other optical media, other physical media with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Event", as used herein, refers to a processor microarchitecture event, including, but not limited to, instruction cache misses, data cache misses, retired branches, hazard stalls, and other related events.

"Logic", as used herein, includes but is not limited to hardware, firmware, software stored in a computer-readable storage medium and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically and/or statically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable storage medium as defined previously.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

To provide context, FIG. 1 illustrates two views of an example execution pipeline for a microprocessor. The pipeline is illustrated at both a high level of abstraction (right side, 100A) and a more detailed level (left side 100B). While the example execution pipeline borrows from the Itanium® series of processors it more generally describes a multiple stage pipeline. It is to be appreciated that example systems and methods described herein are not limited to a processor having this example execution pipeline.

The pipeline 100B includes ten stages. The ten stages can more abstractly be considered as four higher level stages as illustrated in pipeline 100A. Three stages (instruction pointer generation (IPG) 105, fetch 110, and rotate 115) form a front-end stage 160 of pipeline 100A. The front end stage 160 may include fetching and delivering an instruction to a decoupling buffer that facilitates having the front end 160 operate independently from the remainder of pipeline 100A. An instruction cache miss may occur, for example, during processing performed by the front end 160.

Two stages (expand 125, rename 130) form an instruction delivery stage 165 in pipeline 100A. The instruction delivery stage 165 may include actions like, register renaming, dispersal, and the like. Similarly two stages (wordline decode 135, register read 140) form an operand delivery stage 170 in pipeline 100A. The operand delivery stage 170 may include actions like, accessing register files, delivering data after processing predicate control, and so on. A data cache miss may occur, for example, during processing performed in the operand delivery stage 170. Similarly, a data dependency hazard stall may occur, for example, during processing performed in the operand delivery stage 170.

Three stages (execute 145, exception detection 150, writeback 155) may form an execution and retirement stage 175 in pipeline 100A. The execution and retirement stage 175 may include actions like, parallel execution, exception management and retirement. A data dependency hazard may occur, for example, during the execution and retirement stage 175. Similarly, a control hazard and/or a structural hazard may occur during the execution and retirement stage 175.

Thus, the example pipelines illustrated in FIG. 1 facilitate understanding that instructions may be executed in various pipestages, and that countable events may be associated with instruction execution at the various pipestages. Typically, instruction pointer data (e.g., address of an instruction) is captured when an instruction is retired from a pipeline. However, it may be desired to acquire and/or examine instruction pointer data associated with an instruction located at a different pipestage if that instruction caused or was associated with a countable event. Therefore, example systems and methods described herein may facilitate acquiring instruction addresses associated with performance monitoring events, where those events may be associated with instructions executing at an identified stage in an execution pipeline.

Figure 2:
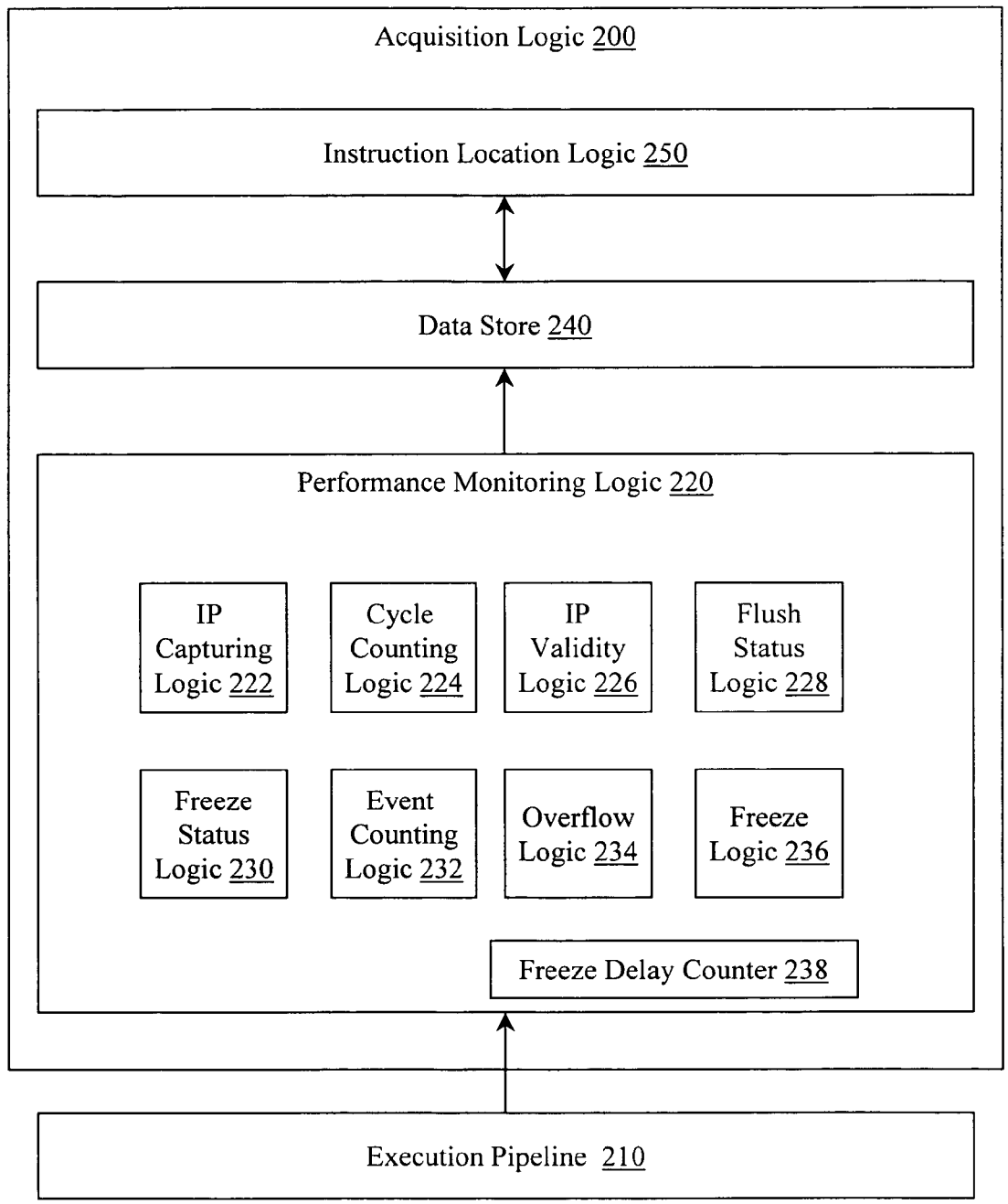
FIG. 2 illustrates an example acquisition logic configured to facilitate acquiring addresses associated with instructions that cause performance monitoring events.

FIG. 2 illustrates an example acquisition logic 200 that is configured to facilitate acquiring instruction addresses associated with performance monitoring events. The logic 200 may include a data store 240 that is configured to store data (e.g., records) associated with instructions processed by a pipelined processor. While the data store 240 is illustrated inside acquisition logic 200, it is to be appreciated that the data store 240 may, alternatively, be external to and operably connected to logic 200. The data store may take forms like, a queue, a circular queue, a list, a table, a stack, and so on. In one example, records are written to the data store 240 when instructions retire from the execution pipeline 210.

While the term "record" is employed in connection with data store 240, it is to be appreciated that more generally data store 240 stores data (e.g., addresses, operands, validity bit values, state values) concerning instructions processed by a pipelined processor. Thus, the use of the term record is not intended to limit the discussion to conventional tables and records. Rather, the term record is intended to convey the concept of a related collection of data that may be addressed in the aggregate and/or that may have its constituent members (e.g., fields) be addressed. In one example, the data store 240 is a first-in-first-out (FIFO) data structure where each entry stores address and state information. The state information may include the number of cycles performed by the pipelined processor since a previous write to the data store 240. In one example, data stored in records written to the data store 240 may include data like an instruction pointer field, a cycle count field, an instruction pointer validity field, a pipeline flush status field, and a data store freeze status field.

A pipelined processor may include an execution pipeline 210 that includes various execution phases. In one example, the execution pipeline 210 may include a fetch stage, a decode stage, an execute stage, a write back stage, and a retirement stage. While five stages are described, it is to be appreciated that execution pipelines with greater and/or lesser number of stages may be employed. The number of stages in the execution pipeline 210 may be stored in the acquisition logic 200. The pipelined processor may be, for example, a microprocessor. In one example, the execution pipeline 210 is associated with an in-order machine that does not reorder instructions.

The acquisition logic 200 may also include a performance monitoring logic 220 that is configured to detect an event caused by an instruction in the execution pipeline 210. The event may be caused, for example, by an instruction cache miss, a data cache miss, a pipeline hazard, a pipeline instruction recirculate operation, and so on. While four types of events are described, it is to be appreciated that other types of events may also be monitored by, detected, and/or counted by the performance monitoring logic 220.

The performance monitoring logic 220 may also be configured to store state and address information associated with instructions and events. For example, the performance monitoring logic 220 may be configured to collect and store information about a processor state when an event occurred. The information may be stored in the data store 240 or elsewhere in the acquisition logic 200. Additionally, the performance monitoring logic 220 may be configured to write information concerning retiring instructions to the data store 240. Furthermore, the performance monitoring logic 220 may be configured to write information concerning an instruction to the data store 240 on the cycle before the data store 240 is frozen, regardless of whether the instruction has retired. In one example, the performance monitoring logic 220 may be configured to write the value of a state bit (e.g., valid bit) whenever the data store 240 is written.

The performance monitoring logic 220 may also be configured to selectively suspend the writing of records to the data store 240 upon the occurrence of an identified event. This may be referred to as "freezing" the data store 240. The data store 240 may be frozen to facilitate preserving information associated with an instruction related to a particular event and/or information associated with instructions temporally related to the occurrence of the particular event. Freezing may be necessary since the data store 240 may have a finite size.

There may be a delay between the occurrence of an event and the freezing of the data store 240. This delay may be referred to as a minimum freeze delay. A data value may store the minimum freeze delay in the acquisition logic 200. The minimum freeze delay accounts for a delay arising because an event may occur and be substantially instantaneously handled by the performance monitoring logic 220 while the data store 240 may not be frozen as quickly. In different examples, the events may not be substantially instantaneously handled by the performance monitoring logic 220. Thus, the minimum freeze delay may include time that passes between the event and the handling by the performance monitoring unit 220 as well as time that passes between when the event is counted and the freezing of the data store 240.

There may also be a delay between the occurrence of an event and the retirement of the instruction that caused the event. The length of the delay between occurrence and freezing, measured in cycles, may be stored in a variable in the data store 240. There may also be a delay between the point at which an instruction retires and the point when a record concerning the retiring instruction is written to the data store 240. This delay may be referred to as a write delay. Additionally, in one example, a user may configure the performance monitoring logic 220 to continue gathering data and writing records to the data store 240 for a number of cycles after the occurrence of an event. This delay may be referred to as a programmed freeze delay.

Storing information concerning the various delays facilitates determining how many cycles to count back in collected data to locate a first record associated with an instruction that was retiring at the time an event occurred. In one example, while moving back through data, various status identifiers may be examined to determine the likelihood that valid data identifying the address that caused the event will be found. These identifiers may include, for example, an IP validity status field, a flush status field, a freeze status field, and so on.

The acquisition logic 200 may also include an instruction location logic 250 that is configured to navigate through data (e.g., records) in the data store 240 to facilitate determining the address of an instruction associated with the identified event. While instruction location logic 250 is illustrated in acquisition logic 200, it is to be appreciated that in some examples instruction location logic 250 may be implemented in software and not in the acquisition logic 200. In one example, the instruction location logic 250 may process cycle based data to locate a first record associated with an instruction that was retiring from the pipelined processor when the identified event occurred. The various delays described above may factor into how far back in time this cycle based counting reaches. Then, the instruction location logic 250 may process retirement count data to locate a second record associated with the instruction that was executing at a desired pipeline stage when the identified event occurred. Having collected data concerning events and instructions retiring from the execution pipeline 210, the acquisition logic 220 may attempt to locate an instruction address associated with a particular event. Thus, the acquisition logic 200 may include the instruction location logic 250. In one example, the instruction location logic 250 may include a cycle counting logic (not illustrated) that is configured to locate the first record in the data store 240 by examining cycle count data. Similarly, the instruction location logic 250 may include a retirement counting logic (not illustrated) that is configured to locate the second record in the data store 240 by examining retirement data.

The performance monitoring logic 220 may include various logics or perform certain actions that capture a variety of data that facilitates cycle and/or retirement counting to locate an instruction address associated with a performance monitoring event. For example, the performance monitoring logic 220 may include an instruction pointer capturing logic 222 that is configured to acquire the address of an instruction retiring from the execution pipeline 210 and to store the address in the data store 240. The address may be aggregated with other state information in a record, as described above.

The performance monitoring logic 220 may also include a cycle counting logic 224 that is configured to count the number of cycles that occur between writes to the data store 240. This information may be stored in the data store 240. In one example, the cycle count information may be aggregated with an instruction address captured by the instruction pointer capturing logic 222 and written as a record to the data store 240. Knowing the number of cycles that occurred between writes to the data store 240, and thus knowing the number of cycles that occurred between instruction retirements, facilitates navigating the stored address and state information to locate an instruction that was retiring at the time an event occurred.

The performance monitoring logic 220 may also include an instruction pointer validity logic 226 that is configured to capture a validity data concerning whether an instruction whose address is captured by the instruction pointer capturing logic 222 was retired from the execution pipeline 210 when the data store 240 was frozen. The instruction pointer validity logic 226 may store the validity data in the data store 240 as, for example, part of a record aggregating the address information and cycle count information. In one example, the instruction pointer validity logic 226 writes a first value (e.g., one) to the record written to the data store 240 if there is a valid instruction retiring when the data store 240 is frozen. If the data store 240 is frozen at a time when there is not a valid instruction retiring, then a second value (e.g., zero) may be written by the instruction pointer validity logic 226 to an instruction pointer validity field in the data store 240. When moving back through records on a cycle basis, encountering a certain value (e.g., second value, zero) in an instruction pointer validity field may indicate that it may not be possible to acquire an instruction address associated with a certain performance monitoring event.

The performance monitoring logic 220 may also include a flush status logic 228 that is configured to capture a flush status data concerning whether the execution pipeline 210 was flushed between writes to the data store 240. The flush status logic 228 may also be configured to store the pipeline flush status data in the data store 240 as, for example, part of a record associated with a retiring instruction. In one example, the flush status logic 228 may write a first value (e.g., one) to a flush status field in the record to indicate that a pipeline flush occurred since the previous write to the data store. The flush status logic 228 may, for example, employ a one bit counter that is cleared after each write to the data store 240. If the execution pipeline 210 is flushed, the counter may be incremented. When moving back through records on a cycle basis, encountering a certain value (e.g., first value, one) in a flush status field may indicate that it may not be possible to acquire an instruction address associated with a certain performance monitoring event.

The performance monitoring logic 220 may also include a freeze status logic 230 that is configured to capture a freeze status data concerning whether writing to the data store 240 was suspended before a programmed overflow delay expired. The freeze status logic 230 may be configured to store the freeze status data in the data store 240 as, for example, a field in a record associated with a retiring instruction. In one example, the freeze status logic 230 may write a first value (e.g., one) to a freeze status field in a record if writing to the data store 240 was frozen before a delay whose value is stored in a freeze delay counter 238 could occur. This "early freeze" may occur, for example, due to a context switch, an interrupt, a branch, or the like, which may prevent an instruction from proceeding to the retirement stage in the execution pipeline 210. While counting back through records on a cycle basis, encountering a certain value (e.g., first value, one) in a freeze status field may indicate that it may not be possible to acquire an instruction address associated with a certain performance monitoring event.

The performance monitoring logic 220 may also include an event counting logic 232 that is configured to count a number of selected events. For example, a user may not be interested in the first occurrence of a data cache miss, but may be interested in the one thousandth occurrence. Thus, the event counting logic 232 may be configurable to count events. Similarly, the performance monitoring logic 220 may include an overflow logic 234 that is configured to determine whether a pre-determined number of selected events have occurred. For example, the overflow logic 234 may be programmed to generate a signal when the event counting logic 232 has counted a pre-defined number of events. While the event counting logic 232 and the overflow logic 234 are illustrated as separate logics, it is to be appreciated that these two logics, and other logics in the performance monitoring logic 220 may be combined into single logics.

As described above, writing data records to the data store 240 may be selectively halted. Thus, the performance monitoring logic 220 may include a freeze logic 236 that is configured to selectively suspend the writing of records to the data store 240. In one example, the freeze logic 236 may be configurable to freeze the data store 240 after the occurrence of a pre-determined number of cycles after the occurrence of a selected event.

Figure 3:
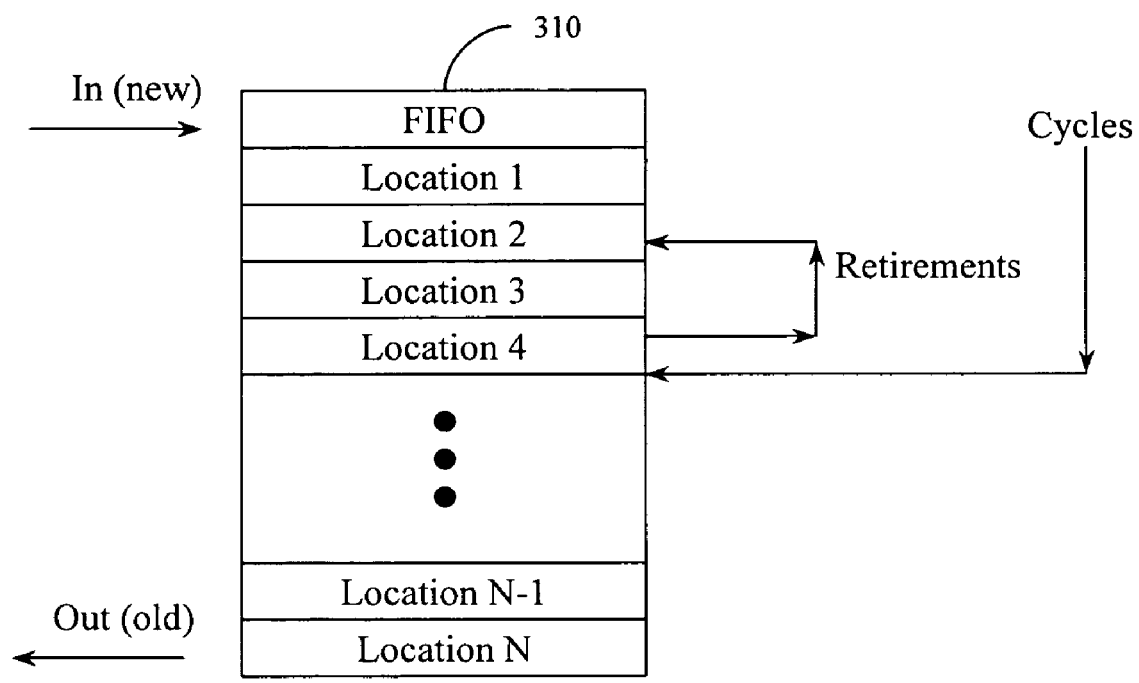
FIG. 3 illustrates example processing associated with a data store configured to store data captured by a performance monitoring system.

FIG. 3 illustrates example processing associated with a data store 310 that is configured to store data captured by a performance monitoring system. The data store 310 may be, for example, a FIFO in which records (or other aggregations) of instruction and state data are stored. A record may be written to FIFO 310 on each retirement of an instruction from an execution pipeline and on the cycle before the FIFO is frozen by, for example, a performance monitoring logic in response to the occurrence of a specific event. Since a record is written to FIFO 310 on each retirement of a record from an execution pipeline, there may be a one-to-one correspondence between FIFO entries and retirement events if there were no empty stages in the execution pipeline.

In one example, if there is no delay from the writing of the instruction address for the retirement event causing the freeze and the freeze itself, and if the event that caused the FIFO 310 to be frozen was retiring at the time it caused the event, then the address of the instruction that caused the event can be retrieved from the last record written to the FIFO 310. However, the retiring instruction may not have been the instruction that caused the event. Or, in other words, the instruction that caused the event that caused the FIFO 310 to be frozen might not have been in the retirement stage of an execution pipeline. However, information concerning the stage at which the instruction that caused the FIFO 310 to be frozen was executing may be available. Furthermore, information concerning the number of cycles associated with the various delays described above may be available.

Thus, in one example, the total number of cycles between the event causing the freeze and the actual freeze of the FIFO 310 may be known and/or determinable. Similarly, the number of cycles that occurred between each write to FIFO 310 may be known and/or determinable because that count may be stored in each record written to the FIFO 310. Thus, it may be possible to logically move back in time through the various records stored in FIFO 310 to locate the record that was retiring at the time the event occurred. This may be referred to as cycle based movement. In FIG. 3, the cycle based movement is illustrated beginning at Location 1, the last record written to the FIFO 310, and moving back through previous records to the record stored at Location 4. By counting cycles, and accounting for the various delays described above, Location 4 can be identified as storing the record associated with the instruction that was retiring at the time the FIFO freezing event occurred.

Having established which instruction was at the last stage (the retirement stage) of an execution pipeline when the FIFO freezing event occurred, example systems and methods described herein may then logically move forward in time through records stored in the FIFO 310 to locate the record associated with an instruction at a desired pipestage. In one example, this logical forward movement can cover enough records to match a number of retirements equal to the number of pipestages in the execution pipeline minus the pipestage at which the event occurred. In FIG. 3, the instruction may have been executing two pipestages from the end of the execution pipeline, and thus a second location (Location 2) that is two locations ahead of the first location (Location 4) may be identified as storing data associated with the instruction that caused the particular event. As described above, a location may store a record, and a record may store an address pointer, and thus by locating an appropriate record in FIFO 310, the address of the instruction that caused a particular performance monitoring event may be retrieved. Again, while records are described, the locations in FIFO 310 may be other aggregates of data. Similarly, while a FIFO is illustrated, other data stores may be employed.

Figure 4:
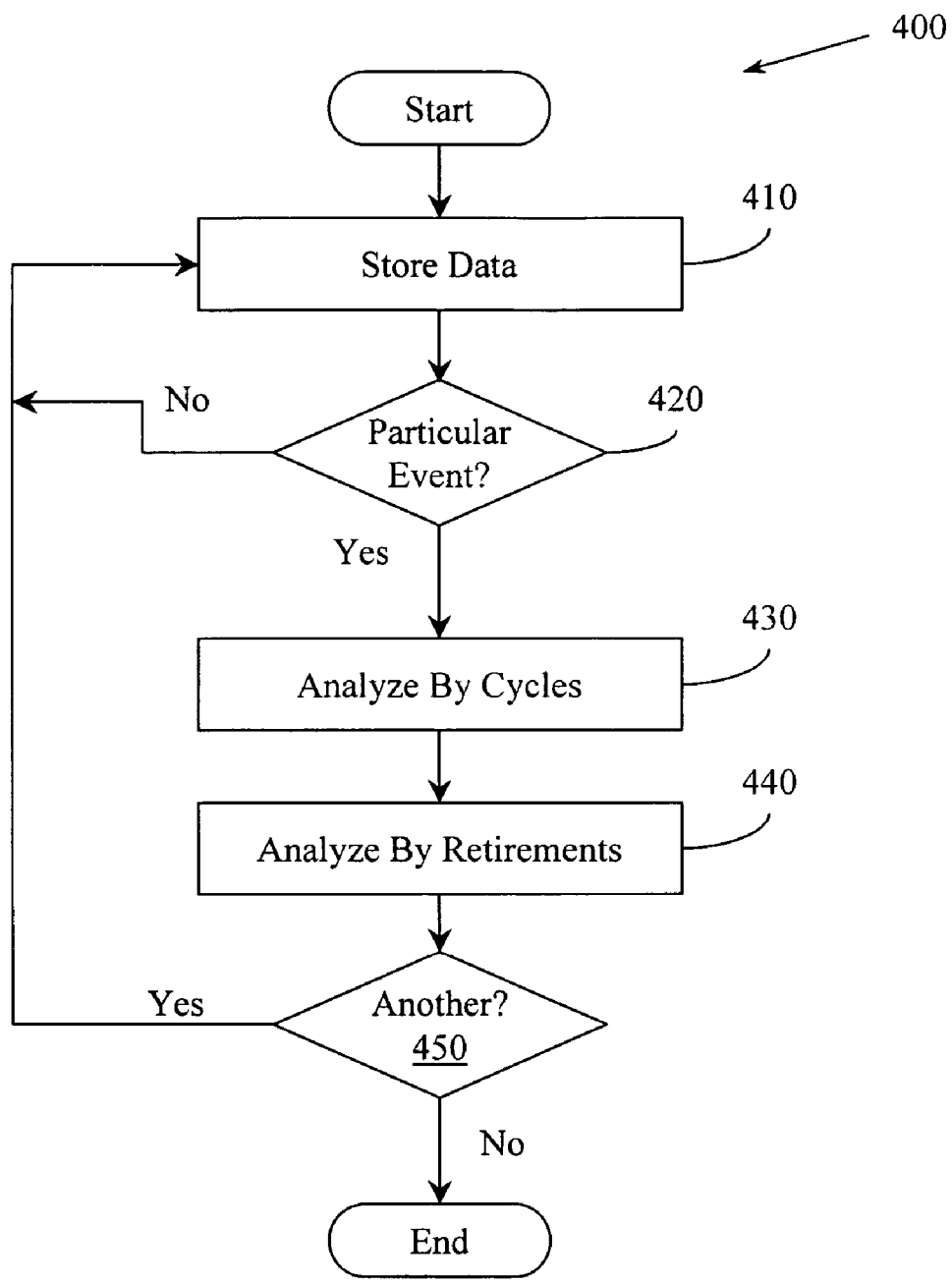
FIG. 4 illustrates an example method for acquiring addresses associated with instructions that cause performance monitoring events.
Figure 5:
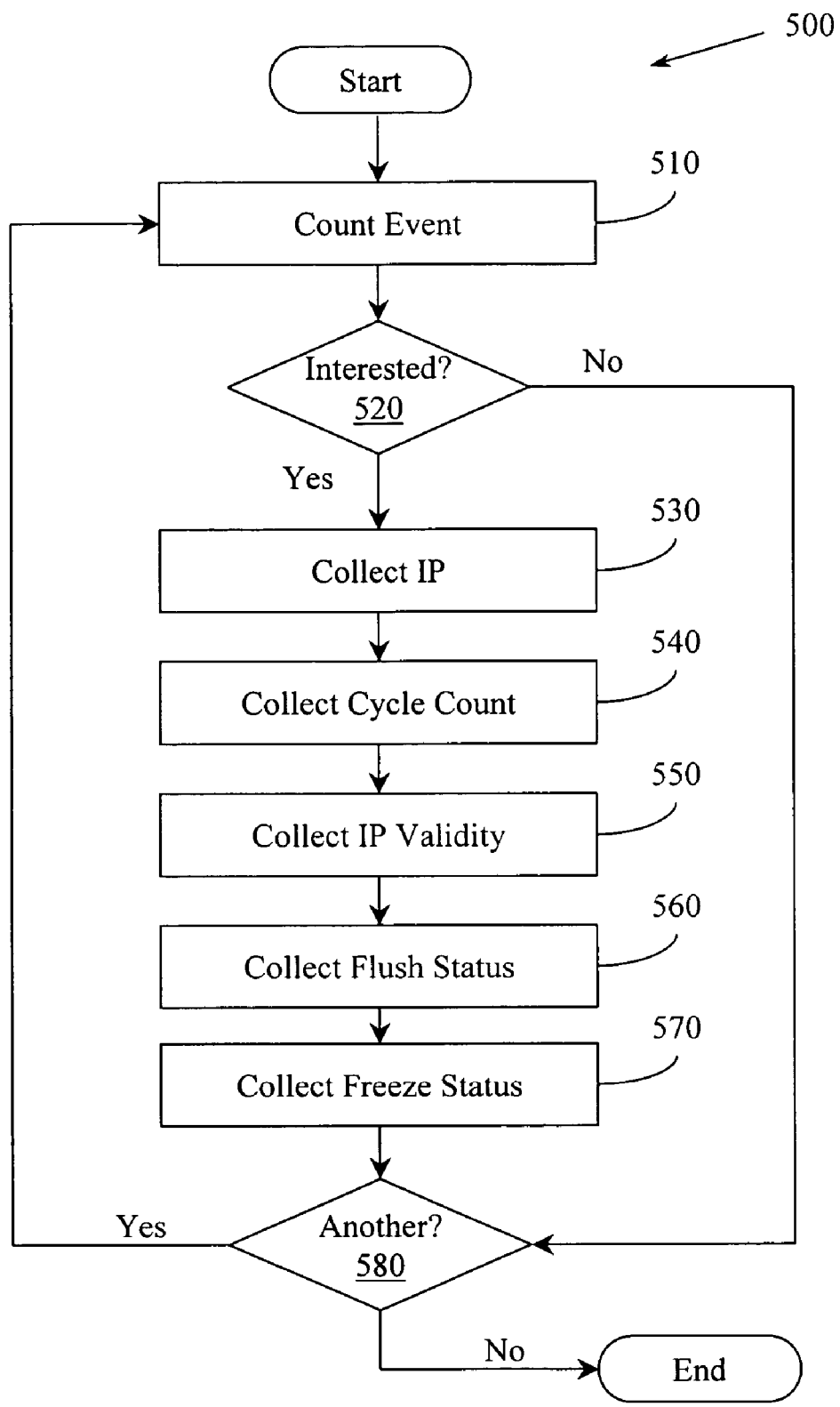
FIG. 5 illustrates an example method for acquiring information associated with performance monitoring.

Example methods may be better appreciated with reference to the flow diagrams of FIGS. 4 and 5. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. The processing blocks may represent a method step and/or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

FIG. 4 illustrates an example method 400 for acquiring addresses associated with instructions that cause performance monitoring events. Method 400 may include, at 410, selectively storing data concerning instructions and/or performance monitoring events related to a pipelined microprocessor. The performance monitoring data may include, for example, pipeline stage data, instruction pointer data, cycle count data, instruction pointer validity data, pipeline flush status data, and data store freeze status data. The data will be stored in a hardware data store.

Method 400 may also include, at 420, determining that a particular performance monitoring event has occurred. In one example, determining that a particular performance monitoring event has occurred may include receiving a signal that an event counter has reached a pre-determined count. For example, a user may be interested in tracking the Nth occurrence of an event and thus, upon the occurrence of that Nth event, a performance monitoring logic may generate a signal that method 400 may receive and interpret as indicating that a desired event has occurred. The performance monitoring event may be, for example, an instruction cache miss, a data cache miss, a pipeline recirculate event, and so on. In one example, the event may be associated with the non-retirement of an instruction. For example, some instructions may need to be recirculated through a pipeline and thus not retired. Therefore, in one example, instructions associated with recirculation causing events may be identified. The determining will be performed in hardware.

Method 400 may also include, at 430, analyzing the data stored at 410 on a processor cycle basis to locate a first performance monitoring data location. The first performance monitoring data location may be associated with an instruction that was retiring from the pipeline in the pipelined microprocessor when the particular performance monitoring event occurred. The first location may store, for example, a record or other aggregation of address and state information.

In one example, analyzing the performance monitoring data on a processor cycle basis may begin by identifying the last performance monitoring data that was stored and accessing a variable (e.g., data value) that stores a count of processor cycles that occurred between the last performance monitoring data being stored and the particular performance monitoring event occurring. Then, starting from the last performance monitoring data stored, the analysis may include moving logically backwards in time through performance monitoring data until an amount of data sufficient to account for the count of processor cycles has been traversed. Having accounted for the appropriate number of processor cycles, the analysis may include establishing the location in the performance monitoring data as the first performance monitoring data location.

Method 400 may also include, at 440, analyzing the performance monitoring data relative to the first performance monitoring data location on a retirement event basis to locate a second performance monitoring data location. The second performance monitoring data location may be associated with an instruction that was executing at an identified pipeline stage in the pipelined microprocessor when the particular performance monitoring event occurred. The second location may store, for example, a record or other aggregation of address and state information.

In one example, analyzing the performance monitoring data relative to the first performance monitoring data location on a retirement event basis may include accessing a variable (e.g., data value) that stores a count of the number of retirement events that occurred between the last performance monitoring data being stored and the particular performance monitoring event occurring and accessing a data value that identifies a pipeline stage with which the particular performance monitoring event is related. Then, starting at the first performance monitoring data location identified at 430, moving logically forwards in time through the performance monitoring data until an amount of performance monitoring data sufficient to account for the number of retirement events is traversed. Having accounted for the appropriate amount of data, the analysis may include establishing the location as the second performance monitoring data location. Since the second performance monitoring data location stores a record associated with the instruction that caused the particular performance monitoring event, the address of that instruction may then be retrieved from the second location.

At 450 a determination may be made concerning whether another cycle of collecting performance monitoring data and acquiring an address associated with a particular performance monitoring event is to occur. If the determination is Yes, then processing may return to 410, otherwise processing may conclude.

In one example, methodologies may be implemented as processor executable instructions and/or operations provided on a computer-readable medium. Thus, in one example, a computer-readable medium may store processor executable instructions operable to perform a method associated with acquiring the address of an instruction associated with causing a performance monitoring event. The method may include, storing data concerning instructions and/or performance monitoring events related to a pipelined microprocessor and determining that a particular performance monitoring event has occurred. The method may also include moving through the performance monitoring data on a processor cycle basis to locate a first performance monitoring data location associated with an instruction that was retiring from the pipeline in the pipelined microprocessor when the particular performance monitoring event occurred and then analyzing the performance monitoring data relative to the first performance monitoring data location on a retirement event basis to locate a second performance monitoring data location associated with an instruction that was executing at an identified pipeline stage in the pipelined microprocessor when the particular performance monitoring event occurred. The method may also include retrieving an address of an instruction associated with the particular performance monitoring event from the second performance monitoring data location.

While the above method is described being provided on a computer-readable medium, it is to be appreciated that other example methods described herein can also be provided on a computer-readable medium.

FIG. 5 illustrates an example method 500 for acquiring information associated with performance monitoring. While method 400 (FIG. 4) included acquiring the address of an instruction associated with causing a performance monitoring event, independent value may be attached to gathering information about instructions other than the exact instruction that caused the event. For example, while it may be the execution of a single instruction at a single phase in an execution pipeline that triggers the counting of a performance monitoring event, it may be a combination of related instructions executing over a period of time at a variety of pipestages that cause (rather than trigger) the event.

Thus, method 500 may include selectively recording instruction and state data for instructions as they retire from a pipeline in a pipelined microprocessor. Additionally, and/or alternatively, method 500 may include selectively recording instruction and state data only upon the occurrence of an event. The instruction and state data may be stored in a hardware-based data store.

Thus, method 500 may include, at 510, counting an event occurring as a result of an instruction being processed at a stage in the pipelined microprocessor. At 520, a determination may be made concerning whether the event is an event for which instruction and state data is to be collected. If the determination at 520 is No, then processing may jump ahead to 580, otherwise processing may continue at 530. The determining will be done in hardware.

Method 500 may include, at 530, selectively collecting address data associated with an instruction retiring from the pipeline and, at 540, selectively collecting cycle count data concerning the number of cycles since a previous address data was collected. Method 500 may also include, at 550, selectively collecting an instruction pointer validity data that identifies whether an instruction for which address data was collected successfully retired from a pipeline in the pipelined microprocessor and, at 560, selectively collecting a flush status data that identifies whether the pipeline was flushed after the recording of the previous data entry and prior to retirement data being recorded for the instruction identified by the address data. Similarly, at 570, data concerning whether a freeze status data that identifies whether recording of performance monitoring data was suspended before retirement data was recorded for the instruction identified by the address data can be collected.

Collecting the instruction pointer data at 530 facilitates locating the address of a particular instruction. Collecting the cycle count data at 540 facilitates determining which record(s) may be associated with different instructions executing at different pipestages. Collecting cycle count data facilitates determining which record was associated with the retirement stage at the time of the event occurrence. Collecting the pipestage validity information, the flush status information and the freeze status information facilitates determining whether the address of a particular instruction is available.

At 580, a determination is made concerning whether another round of counting events and collecting information is to be performed. If the determination at 580 is Yes, then processing may return to 510, otherwise processing may conclude.

Figure 6:
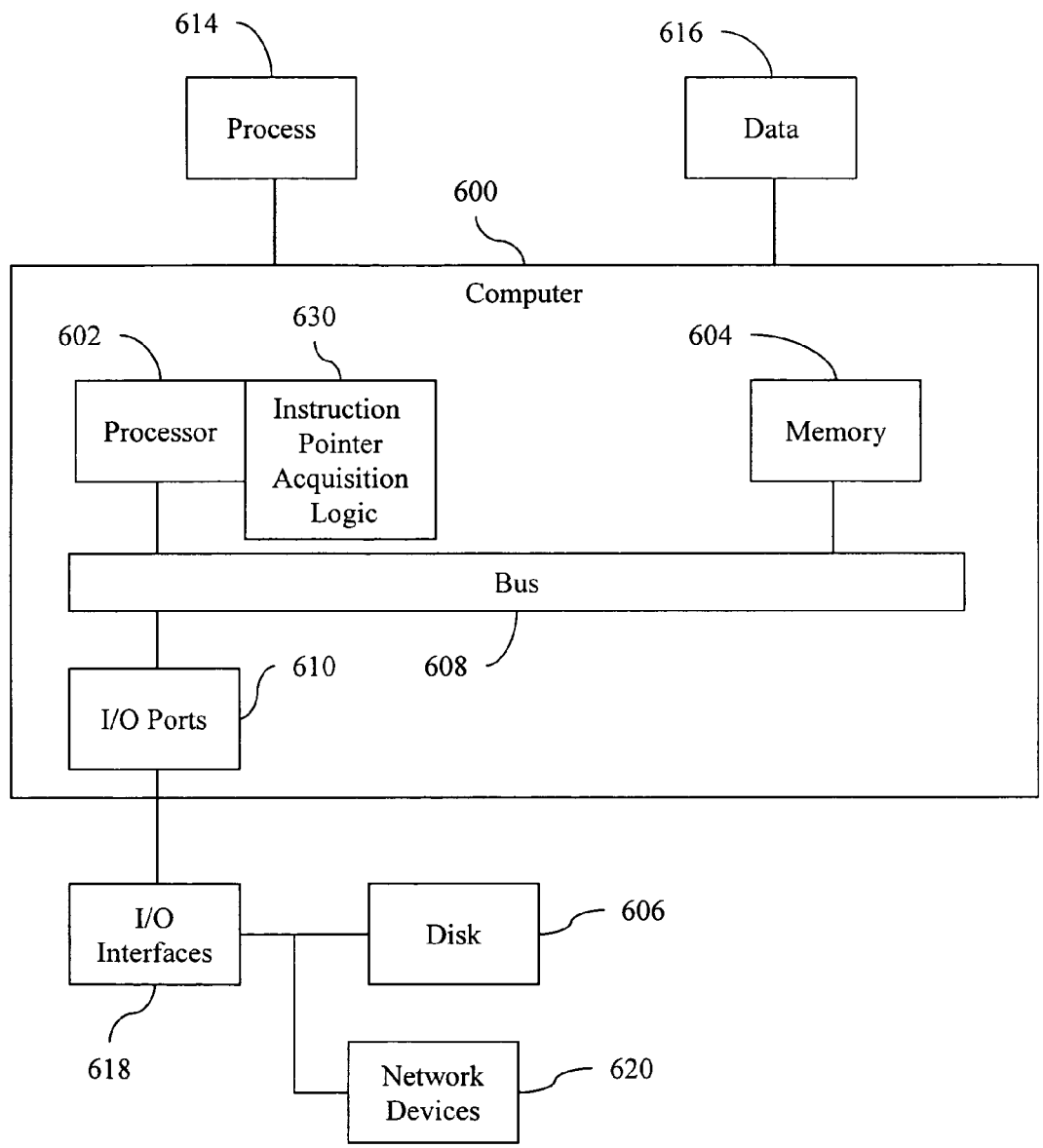
FIG. 6 illustrates an example computing environment in which example systems and methods illustrated herein can operate.

FIG. 6 illustrates a computer 600 that includes a processor 602, a memory 604, and input/output ports 610 operably connected by a bus 608. In one example, the computer 600 may include an instruction pointer acquisition logic 630 configured to facilitate capturing and locating a pointer to an instruction associated with a performance monitoring event. Thus, the instruction pointer acquisition logic 630, whether implemented in computer 600 as hardware, firmware, software, and/or a combination thereof may provide means for recording instruction and state data associated with events countable by performance monitoring logic associated with a pipelined processor like processor 602. Logic 630 may also provide means for traversing the recorded instruction and state data on a cycle count basis and means for traversing the recorded instruction and state data on a retirement count basis. While illustrated as a block separate from processor 602, it is to be appreciated that the instruction pointer acquisition logic 630 may in some examples be incorporated into processor 602.

The processor 602 can be a variety of various processors including dual microprocessor and other multi-processor architectures. The memory 604 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the computer 600 via, for example, an input/output interface (e.g., card, device) 618 and an input/output port 610. The disk 606 can include, but is not limited to, devices like a magnetic disk drive, a solid state disk drive, a floppy disk drive, a tape drive, a Zip drive, a flash memory card, and/or a memory stick. Furthermore, the disk 606 can include optical drives like a CD-ROM, a CD recordable drive (CD-R drive), a CD rewriteable drive (CD-RW drive), and/or a digital video ROM drive (DVD ROM). The memory 604 can store processes 614 and/or data 616, for example. The disk 606 and/or memory 604 can store an operating system that controls and allocates resources of the computer 600.

The bus 608 can be a single internal bus interconnect architecture and/or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 600 may interact with input/output devices via i/o interfaces 618 and input/output ports 610. Input/output devices can include, but are not limited to, a keyboard, a microphone, a pointing and selection device, cameras, video cards, displays, disk 606, network devices 620, and the like. The input/output ports 610 can include but are not limited to, serial ports, parallel ports, and USB ports.

The computer 600 can operate in a network environment and thus may be connected to network devices 620 via the i/o interfaces 618, and/or the i/o ports 610. Through the network devices 620, the computer 600 may interact with a network. Through the network, the computer 600 may be logically connected to remote computers. The networks with which the computer 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 620 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, and/or through a network may include combinations and mixtures of communications.

Figure 7:
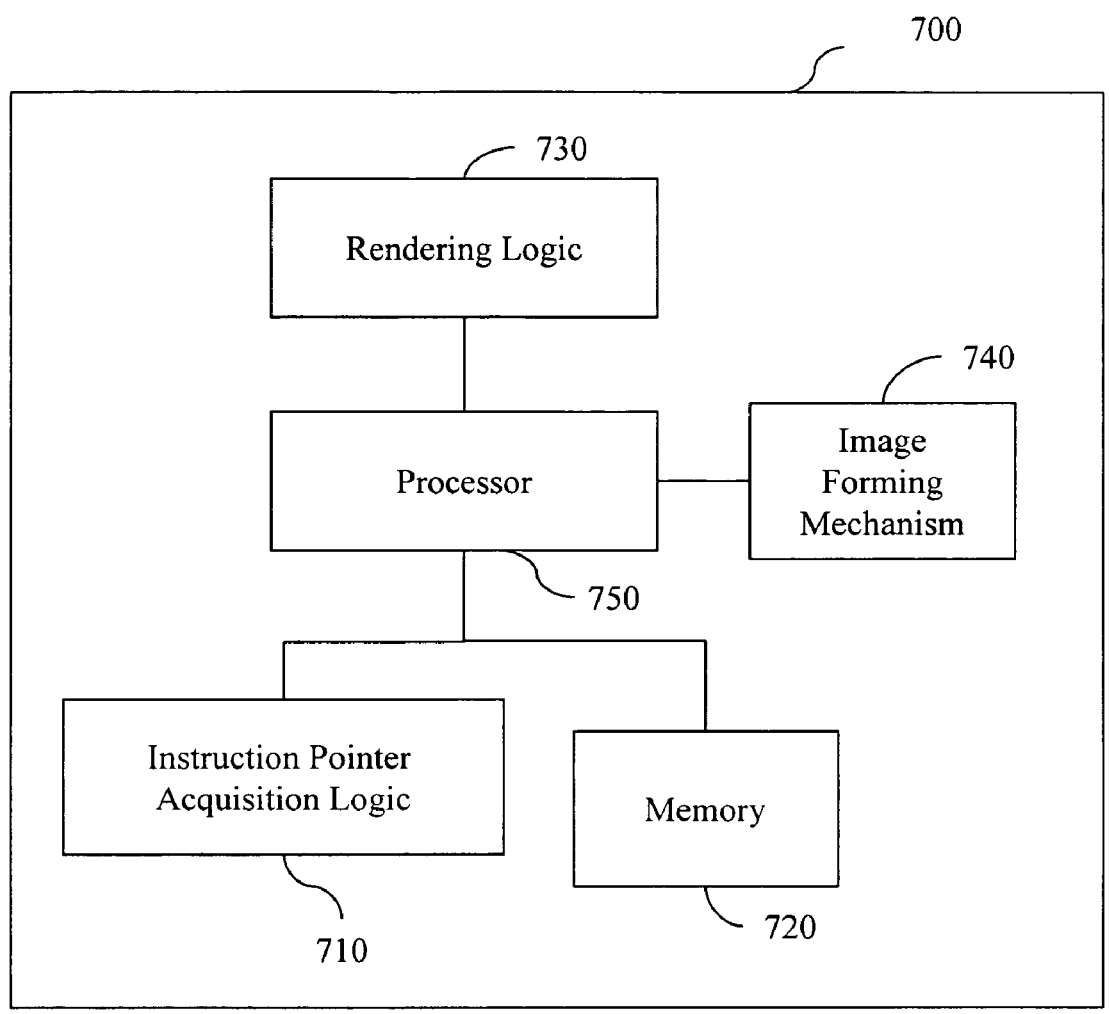
FIG. 7 illustrates an example image forming device in which example systems and methods illustrated herein can operate.

FIG. 7 illustrates an example image forming device 700 that includes an instruction pointer acquisition logic 710 similar to example systems described herein. The instruction pointer acquisition logic 710 may be configured to perform executable methods like those described herein. The instruction pointer acquisition logic 710 may be permanently and/or removably attached to the image forming device 700. While the instruction pointer acquisition logic 710 is illustrated as a block separate from processor 750, it is to be appreciated that in some examples the instruction pointer acquisition logic 710 may be incorporated into processor 750.

The image forming device 700 may receive print data to be rendered. Thus, image forming device 700 may also include a memory 720 configured to store print data or to be used more generally for image processing. The image forming device 700 may also include a rendering logic 730 configured to generate a printer-ready image from print data. Rendering varies based on the format of the data involved and the type of imaging device. In general, the rendering logic 730 converts high-level data into a graphical image for display or printing (e.g., the print-ready image). For example, one form is ray-tracing that takes a mathematical model of a three-dimensional object or scene and converts it into a bitmap image. Another example is the process of converting HTML into an image for display/printing. It is to be appreciated that the image forming device 700 may receive printer-ready data that does not need to be rendered and thus the rendering logic 730 may not appear in some image forming devices.

The image forming device 700 may also include an image forming mechanism 740 configured to generate an image onto print media from the print-ready image. The image forming mechanism 740 may vary based on the type of the imaging device 700 and may include a laser imaging mechanism, other toner-based imaging mechanisms, an ink jet mechanism, digital imaging mechanism, or other imaging reproduction engine. A processor 750 may be included that is implemented with logic to control the operation of the image-forming device 700. In one example, the processor 750 includes logic that is capable of executing Java instructions. Other components of the image forming device 700 are not described herein but may include media handling and storage mechanisms, sensors, controllers, and other components involved in the imaging process.

Figure 8:
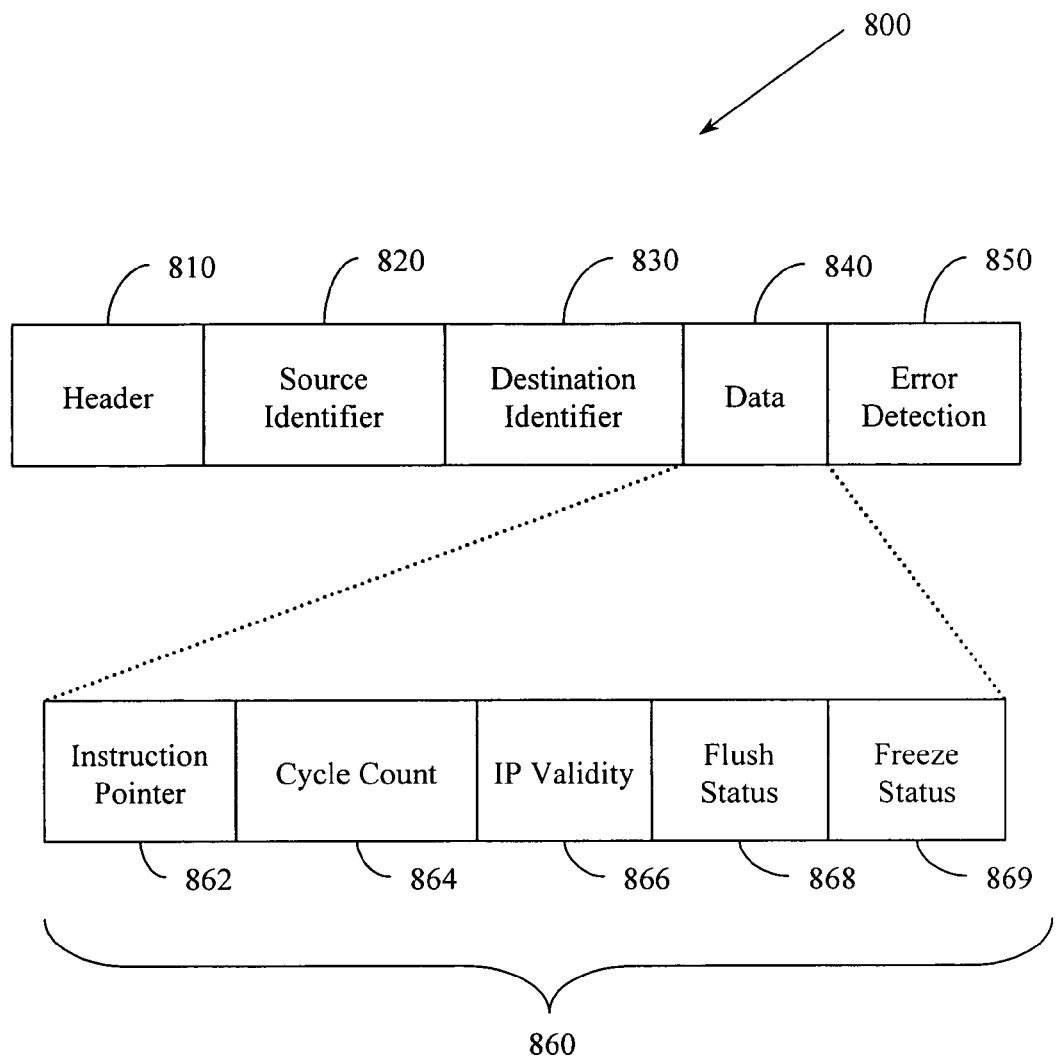
FIG. 8 illustrates an example data packet.

Referring now to FIG. 8, information can be transmitted between various computer components and/or logics associated with performance monitoring as described herein via a data packet 800. The data packet 800 includes a header field 810 that includes information like the length and type of packet. A source identifier 820 follows the header field 810 and includes, for example, an address of the computer component and/or logic from which the packet 800 originated. Following the source identifier 820, the packet 800 includes a destination identifier 830 that holds, for example, an address of the computer component and/or logic to which the packet 800 is ultimately destined. Source and destination identifiers can be, for example, a globally unique identifier (GUID), a uniform resource locator (URLs), a path name, and the like. The data field 840 in the packet 800 includes various information intended for the receiving computer component and/or logic. The data packet 800 ends with an error detecting and/or correcting field 850 whereby a computer component and/or logic can determine if it has properly received the packet 800. While five fields are illustrated in a certain order, it is to be appreciated that a greater and/or lesser number of fields arranged in different orders can be present in example data packets.

FIG. 8 also illustrates sub-fields 860 within the data field 840. The subfields 860 described are merely exemplary and it is to be appreciated that a greater and/or lesser number of sub-fields could be employed with various types of data germane to performance monitoring. The sub-fields 860 include a first field 862 that holds, for example, information concerning an instruction pointer that stores the address of an instruction associated with a performance monitoring event. The instruction pointer may have been retrieved, for example, by a combination of cycle counting and retirement counting in a data store populated by a performance monitoring logic. The sub-fields 840 may also include a second field 864 that holds, for example, cycle count information. The cycle count information may describe, for example, the number of cycles that occurred between two recordings of data associated with retirement events. The sub-fields 840 may also include a third field 866 that holds, for example, instruction pointer validity data. The instruction pointer validity data may identify, for example, whether the instruction associated with the instruction pointer identified in the field 862 was recorded from a pipeline before being retired. The sub-fields 840 may also include a fourth field 868 that holds, for example, flush status information. The flush status information may identify, for example, whether a pipeline was flushed between recordings of data associated with retired instructions. The sub-fields 840 may also include a fifth field 869 that holds, for example, freeze status information. The freeze status information may identify, for example, whether recordings of data associated with retiring instructions were suspended before a desired pre-determined number of cycles expired after an event occurred.

Figure 9:
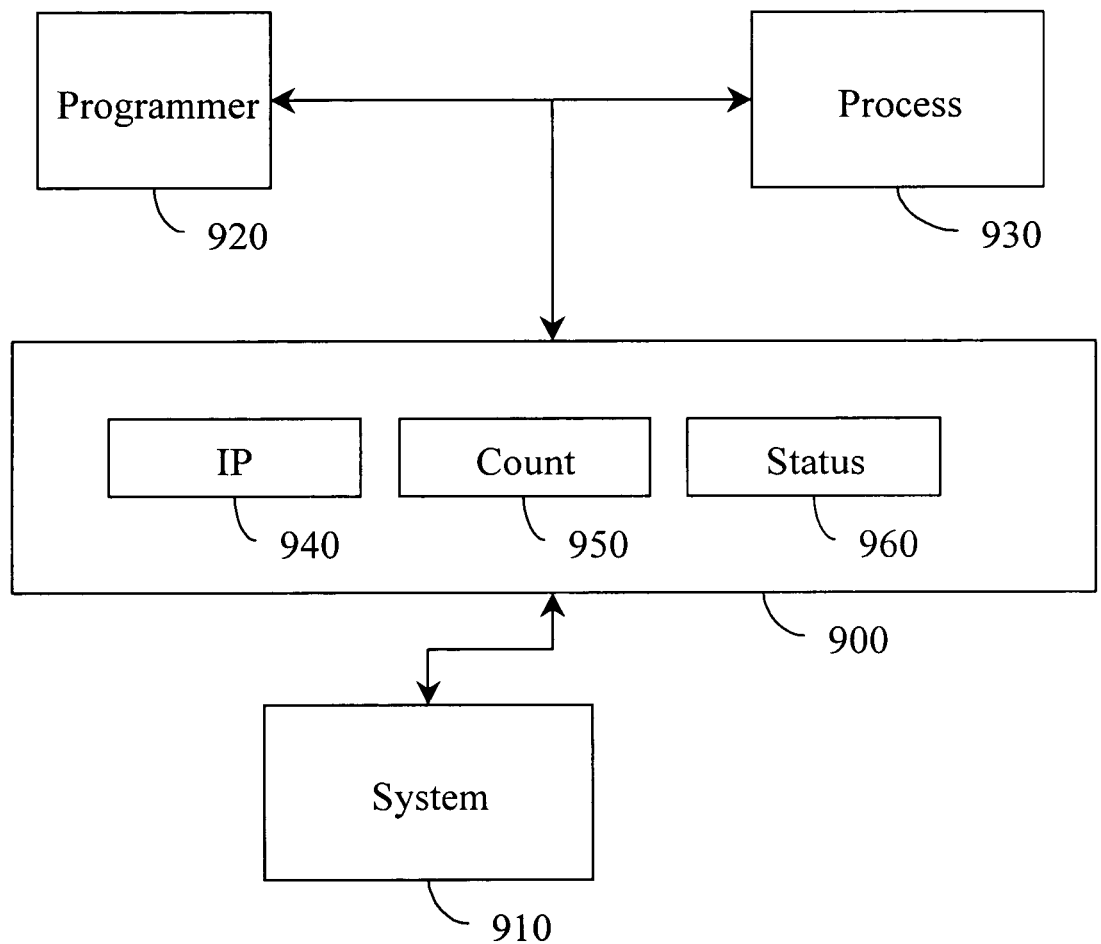
FIG. 9 illustrates an example application programming interface (API).

Referring now to FIG. 9, an application programming interface (API) 900 is illustrated providing access to a system 910 for acquiring data like the address of an instruction associated with (e.g., causing) a performance monitoring event. The API 900 can be employed, for example, by a programmer 920 and/or a process 930 to gain access to processing performed by the system 910. For example, a programmer 920 can write a program to access the system 910 (e.g., invoke its operation, monitor its operation, control its operation) where writing the program is facilitated by the presence of the API 900. Rather than programmer 920 having to understand the internals of the system 910, the programmer 920 merely has to learn the interface to the system 910. This facilitates encapsulating the functionality of the system 910 while exposing that functionality.

Similarly, the API 900 can be employed to provide data values to the system 910 and/or retrieve data values from the system 910. For example, a process 930 that performs performance monitoring analysis may receive status data from the system 910 via the API 900 by, for example, using a call provided in the API 900. Thus, in one example of the API 900, a set of application programming interfaces can be stored on a computer-readable medium. The interfaces can be employed by a programmer, computer component, logic, and so on, to gain access to a system 910 for acquiring data like the address of an instruction associated with a performance monitoring event. The interfaces can include, but are not limited to, a first interface 940 that communicates an instruction pointer data, a second interface 950 that communicates an event count data, and a third interface 960 that communicates a status data. The instruction pointer data may, for example, identify an instruction that caused a performance monitoring event to be counted. The event count data may, for example, identify the number of performance monitoring events for which instruction pointer data is available. The status data may, for example, identify whether valid instruction pointer data is likely to be available in the system 910.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
a data store configured to store a record associated with an instruction processed by a pipelined processor;
a performance monitoring logic configured to detect an event caused by an instruction in the pipelined processor, to store a processor state information concerning the pipelined processor when the event occurred, to write the record to the data store, and to selectively suspend the writing of records to the data store upon occurrence of an identified event; and
an instruction location logic configured to navigate through records in the data store by cycle counting to locate a first record associated with an instruction retiring from the pipelined processor when the identified event occurred and by retirement counting to locate a second record associated with an instruction executing at a pipeline stage when the identified event occurred.

2. The system of claim 1, where an address of an instruction associated with the identified event can be retrieved from the second record.

3. The system of claim 1, the data store comprises a queue, a circular queue, a list, a table, or a stack.

4. The system of claim 1, the event comprises an instruction cache miss, a data cache miss, a pipeline hazard stall, or a pipeline instruction recirculate operation.

5. The system of claim 1, where the processor includes a pipeline that does not reorder instructions.

6. The system of claim 1, the record comprises an instruction pointer field, a cycle count field, a instruction pointer validity field, a pipeline flush status field, and a data store freeze status field.

7. The system of claim 1, the pipeline comprises a fetch stage, a decode stage, an execute stage, a write back stage, and a retirement stage.

8. The system of claim 1, the performance monitoring logic including an instruction pointer capturing logic configured to acquire the address of an instruction retiring from the pipeline and to store the address in the data store.

9. The system of claim 1, the performance monitoring logic including a cycle counting logic to perform the cycle counting to locate the first record by counting the number of cycles that occur between writes to the data store and to store the count in the data store.

10. The system of claim 9, the performance monitoring logic including an instruction pointer validity logic configured to capture a validity data concerning whether an instruction whose address is captured by the instruction pointer capturing logic was retired from the pipeline when the data store was frozen and to store the validity data in the data store.

11. The system of claim 10, the performance monitoring logic including a flush status logic configured to capture a pipeline flush status data concerning whether a pipeline in the pipelined processor was flushed between writes to the data store and to store the pipeline flush status data in the data store.

12. The system of claim 11, the performance monitoring logic including a freeze status logic configured to capture a freeze status data concerning whether writing to the data store was suspended before a programmed overflow delay expired and to store the freeze status data in the data store.

13. The system of claim 12, the performance monitoring logic including an event counting logic configured to count a number of selected events.

14. The system of claim 13, the performance monitoring logic including an overflow logic configured to determine whether a pre-determined number of selected events have occurred.

15. The system of claim 1, the performance monitoring logic including a freeze logic configured to selectively suspend the writing of records to the data store after the occurrence of a pre-determined number of cycles after the occurrence of a selected event.

16. The system of claim 1, the instruction location logic comprises a cycle counting logic configured to locate the first record in the data store by examining cycle count data in the data store.

17. The system of claim 16, the instruction location logic including a retirement counting logic configured to locate the second record in the data store by examining retirement data in the data store.

18. A system, comprising:
a data store configured to store a record associated with an instruction processed by a pipelined processor;
a performance monitoring logic configured to:
detect an event caused by an instruction in the pipelined processor, where the event comprises one of an instruction cache miss, a data cache miss, a pipeline hazard stall, and a pipeline instruction recirculate operation;
to store in a record a processor state information concerning the pipeline when the event occurred;
to write the record to the data store, where the record includes an instruction pointer field, a cycle count field, an instruction pointer validity field, a pipeline flush status field, and a data store freeze status field; and
to selectively suspend the writing of records to the data store upon the occurrence of an identified event; and
where the performance monitoring logic includes:
an instruction pointer capturing logic configured to acquire the address of an instruction retiring from the pipeline and to add the address to the record;
a cycle counting logic configured to count the number of cycles that occur between writes of records to the data store and to add the count to the record;
an instruction pointer validity logic configured to capture a validity data concerning whether an instruction whose address is captured by the instruction capturing logic was retired from the pipeline when the pipeline was frozen and to add the validity data to the record;
a flush status logic configured to capture a pipeline flush status data concerning whether a pipeline in the pipelined processor was flushed between writes of records to the data store and to add the pipeline flush status data to the record; and
a freeze status logic configured to capture a freeze status data concerning whether record writing to the data store was frozen before a programmed overflow delay expired and to add the freeze status data to the record; and
an instruction location logic configured to navigate records in the data store to determine the address of an instruction associated with the identified event by cycle counting to locate a first record associated with an instruction retiring from a pipeline in the pipelined processor when the identified event occurred and by retirement counting to locate a second record associated with an instruction executing at the pipeline stage when the identified event occurred, where the instruction location logic includes:
a cycle counting logic configured to locate the first record by examining cycle count data in one or more records in the data store; and
a retirement counting logic configured to locate the second record in the data store by examining retirement data in one or more records in the data store.

19. A method, comprising:
storing, in a memory of a computing device, performance monitoring data concerning performance monitoring events related to a pipelined microprocessor;
determining, by at least a monitoring logic of the computing device, that a particular performance monitoring event has occurred;
analyzing, by at the monitoring logic of the computing device, the performance monitoring data on a processor cycle basis to locate a first performance monitoring data location associated with an instruction that was retiring from the pipeline in the pipelined microprocessor when the particular performance monitoring event occurred; and
analyzing, by at least the monitoring logic of the computing device, the performance monitoring data relative to the first performance monitoring data location on a retirement event basis to locate a second performance monitoring data location associated with an instruction that was executing at an identified pipeline stage in the pipelined microprocessor when the particular performance monitoring event occurred.

20. The method of claim 19, where the performance monitoring data includes pipeline stage data, instruction pointer data, cycle count data, instruction pointer validity data, pipeline flush status data, or data store freeze status data.

21. The method of claim 19, where determining that a particular performance monitoring event has occurred includes receiving a signal that an event counter has reached a pre-determined count.

22. The method of claim 19, where the particular performance monitoring event comprises an instruction cache miss, a data cache miss, an instruction retirement, or a pipeline recirculate event.

23. The method of claim 19, where analyzing the performance monitoring data on a processor cycle basis includes:
identifying the last performance monitoring data that was stored;

accessing a data value that stores a count of processor cycles that occurred between the last performance monitoring data being stored and the particular performance monitoring event occurring;

starting from the last performance monitoring data stored, moving logically backwards in time through the performance monitoring data until an amount of performance monitoring data sufficient to account for the count of processor cycles has been traversed; and establishing the location in the performance monitoring data as the first performance monitoring data location.

24. The method of claim 23, where analyzing the performance monitoring data relative to the first performance monitoring data location on a retirement event basis includes:

accessing a data value that stores a count of the number of retirement events that occurred between the last performance monitoring data being stored and the particular performance monitoring event occurring;

accessing a data value that identifies a pipeline stage with which the particular performance monitoring event is related;

starting at the first performance monitoring data location, moving logically forwards in time through the performance monitoring data until an amount of performance monitoring data sufficient to account for the number of retirement events is traversed; and establishing the location as the second performance monitoring data location.

25. The method of claim 24, comprising:

retrieving an address of an instruction associated with the particular performance monitoring event from the second performance monitoring data location.

26. The method of claim 25, including selectively halting the storing of performance monitoring data upon the expiration of a pre-determined, configurable delay.

27. A method, comprising:

storing, in a memory of a computing device, performance monitoring data concerning performance monitoring events related to a pipelined microprocessor of the computing device, where the performance monitoring data includes one or more of, pipeline stage data, instruction pointer data, cycle count data, instruction pointer validity data, pipeline flush status data, and data store freeze status data;

determining that a particular performance monitoring event has occurred by receiving a signal that an event counter has reached a pre-determined count, where the particular performance monitoring event comprises one of, an instruction cache miss, a data cache miss, an instruction retirement, and a pipeline recirculate event;

analyzing the performance monitoring data from the memory on a processor cycle basis to locate a first performance monitoring data location associated with an instruction that was retiring from the pipeline in the pipelined microprocessor when the particular performance monitoring event occurred, where analyzing the performance monitoring data on a processor cycle basis is performed at least in part by the pipelined microprocessor and includes:

identifying the last performance monitoring data that was stored;

accessing a data value that stores a count of processor cycles that occurred between the last performance monitoring data being stored and the particular performance monitoring event occurring;

starting from the last performance monitoring data stored, moving logically backwards in time through the performance monitoring data until an amount of performance monitoring data sufficient to account for the count of processor cycles has been traversed; and establishing the location in the performance monitoring data as the first performance monitoring data location; and analyzing the performance monitoring data relative to the first performance monitoring data location on a retirement event basis to locate a second performance monitoring data location associated with an instruction that was executing at an identified pipeline stage in the pipelined microprocessor when the particular performance monitoring event occurred, where analyzing the performance monitoring data relative to the first performance monitoring data location on a retirement event basis is performed at least in part by the pipelined microprocessor and includes:

accessing a data value that stores a count of the number of retirement events that occurred between the last performance monitoring data being stored and the particular performance monitoring event occurring;

accessing a data value that identifies a pipeline stage with which the particular performance monitoring event is related;

starting at the first performance monitoring data location, moving logically forwards in time through the performance monitoring data until an amount of performance monitoring data sufficient to account for the number of retirement events is traversed; and establishing the location as the second performance monitoring data location.

28. A non-transitory computer-readable storage medium storing processor executable instructions operable to perform a method, the method comprising:

analyzing monitoring data concerning performance monitoring events related to a pipelined microprocessor;

determining that a particular performance monitoring event has occurred;

moving through the performance monitoring data on a processor cycle basis to locate a first performance monitoring data location associated with an instruction that was retiring from the pipeline in the pipelined microprocessor when the particular performance monitoring event occurred;

analyzing the performance monitoring data relative to the first performance monitoring data location on a retirement event basis to locate a second performance monitoring data location associated with an instruction that was executing at an identified pipeline stage in the pipelined microprocessor when the particular performance monitoring event occurred; and retrieving an address of an instruction associated with the particular performance monitoring event from the second performance monitoring data location and controlling a processor to respond to the instruction associated with the particular performance monitoring event.

29. A system for acquiring instruction addresses associated with performance monitoring events, comprising:

means for recording instruction and state data associated with events countable by performance monitoring logic associated with a pipelined processor;

means for traversing the instruction and state data on a cycle count basis; and means for traversing the instruction and state data on a retirement count basis.

30. A method, comprising:

recording, in a memory of a computing device, instruction and state data for instructions as they retire from a pipeline in a pipelined microprocessor of the computing device;

counting an event caused by an instruction executing at a pipestage in the pipelined microprocessor; and determining whether the event is an event for which the instruction and state data is to be collected, and, upon determining that the event is an event for which the instruction and state data is to be recorded, controlling a processor to perform the following:

selectively collecting address data associated with an instruction retiring from the pipeline;

selectively collecting cycle count data concerning the number of cycles since a previous address data was collected;

selectively collecting an instruction pointer validity data that identifies whether an instruction for which address data was collected successfully retired from a pipeline in the pipelined microprocessor;

selectively collecting a flush status data that identifies whether the pipeline was flushed prior to retirement data being recorded for the instruction identified by the address data; and selectively collecting a freeze status data that identifies whether recording of performance monitoring data was suspended before retirement data was recorded for the instruction identified by the address data.

* * * * *